Nov. 4, 1941. B. ORLOFF 2,261,558

FLUID SUPPORTED VEHICLE AND METHOD OF RPODUCING THE SAME

Filed Feb. 28, 1939 2 Sheets-Sheet 1

INVENTOR
Benjamin Orloff,
BY
J. Stuart Freeman
ATTORNEY

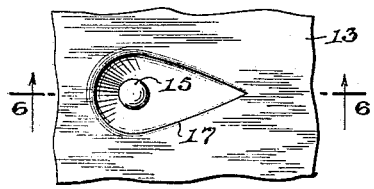
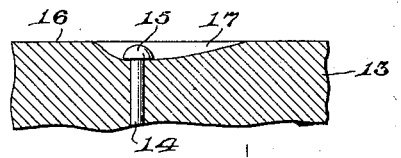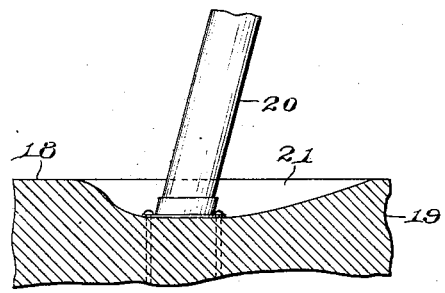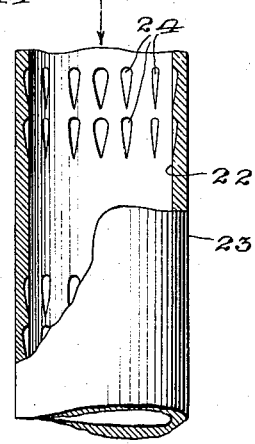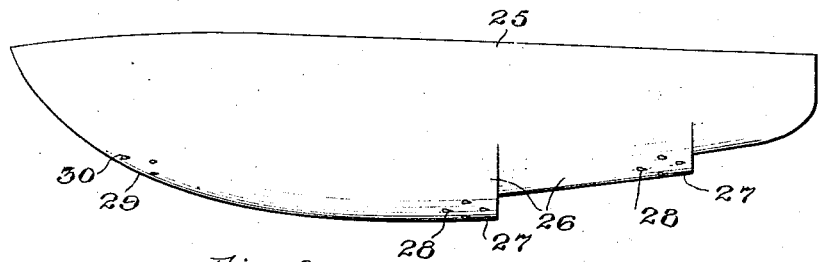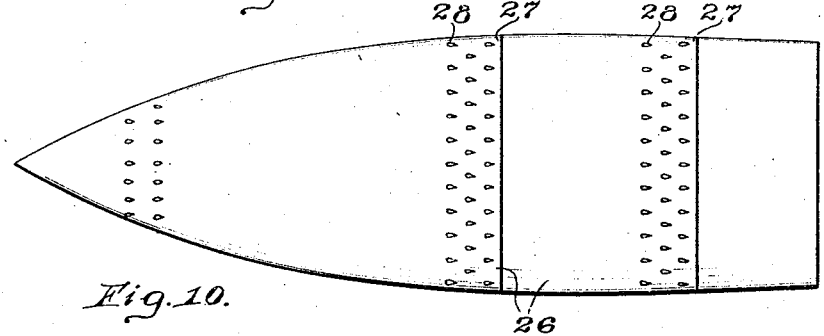

Patented Nov. 4, 1941

2,261,558

UNITED STATES PATENT OFFICE 2,261,558

FLUID SUPPORTED VEHICLE AND METHOD OF PRODUCING THE SAME

Benjamin Orloff, Philadelphia, Pa.

Application February 28, 1939, Serial No. 258,889

5 Claims. (Cl. 244—130)

The object of the invention is to provide improvements in the construction of bodies designed for flight, including both air-borne craft and water craft, this application comprising a continuation-in-part of copending application, Serial No. 99,273, filed September 3, 1936.

Another and more specific object is to provide in the surfaces of both aircraft and water craft, that is, upon aero- and hydro-dynamic bodies, a system of irregularities, taking the form of recesses of various sorts and shapes, such as will minimize the air and water surface resistance offered by such bodies, especially while proceeding at relatively high speeds.

Figure 1:
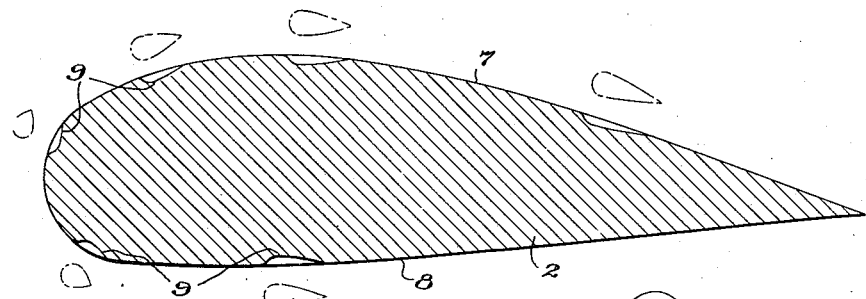
Figure 2:
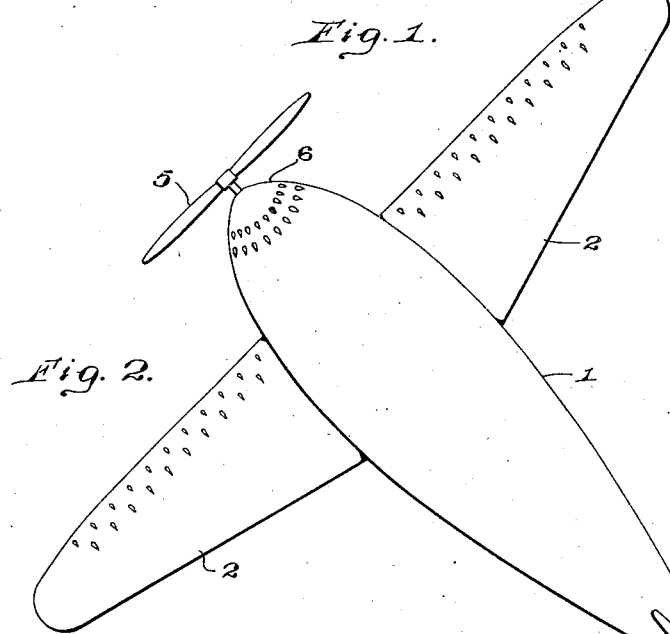
Figure 3:
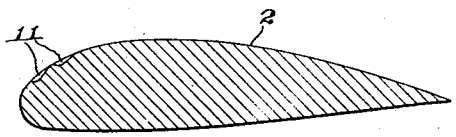
Figure 4:
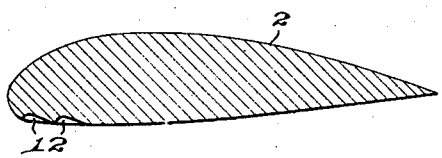

Bearing in mind that among the various basic shapes the so-called true streamlined body in general offers the least resistance to the fluid in contact with it, more detailed objects of the present invention comprise the further reduction of drag upon such streamlined bodies and airfoil sections; reducing the drag by pitting or recessing the vacuum or low pressure side of an airfoil; increasing the lift by increasing the pressure as the result of properly pitting or recessing the pressure side of an airfoil; reducing the suction and thereby reducing the drag of water upon a boat hull or float at high speeds, by properly arranging the number and positions of the pits or recesses upon the under surfaces of such boat; increasing the flow of liquids through pipes and the like by properly pitting or recessing the inner surfaces of such conducting means; reducing of the drag caused by the flow of air around rivets, wires, strut connections, and the like, by countersinking the surrounding surface areas; and to provide additional details of construction, as hereinafter fully brought out in the following description, when read in conjunction with the accompanying drawings, in which Fig. 1 represents a transverse section through a representative type of aircraft wing or similar object, together with dot-and-dash lines surrounding the same, to represent approximately the shape of each of the correspondingly positioned recesses in the surface of said wing, and also representing the best shape for openings in the skin of aerodynamic bodies where required; Fig. 2 is a top plan view of a representative type of aircraft showing the position of drag-minimizing recesses in the leading surfaces of the two oppositely extending wings and the stabilizers, and in the forward or nose portion of the fuselage; Figs. 3 and 4 represent transverse sections through a wing, the former being provided with recesses upon the upper portion of its leading edge, while the latter is provided with recesses upon the lower portion of such edge; Fig. 5 is an enlarged fragmentary view of a portion of the surface of a type of aircraft or the like, showing the method of countersinking the heads of rivets and similar normally protruding articles within the recesses hereinafter described; Fig. 6 is a section on the line 6—6 of Fig. 5; Fig. 7 is a section similar to that of Fig. 6, but representing the method of securing a strut or wire to and within one of the recesses in the surface of an aircraft; Fig. 8 is a partly elevational view, partly in section, of a pipe, tube, or other form of conduit provided upon its interior with series of recesses designed and arranged in accordance with the present invention; Fig. 9 is a side elevational view of a representative type of water craft, showing the usual water-contacting surfaces provided with spaced recesses in accordance with the present invention; and Fig. 10 is a bottom plan view of the same.

Referring to Figs. 1, 2, 3, and 4, we have here an airplane as an example of a body which is designed and adapted to move at high speeds through the air, said airplane for purposes of illustration comprising a fuselage 1, laterally extending wings 2, elevating or stabilizing elements 3, and the usual rudder 4 and propeller 5. Each of the forward portions of the respective wings, stabilizing elements, nose 6 of the fuselage and similar leading portions of the structure are provided with fairly definitely shaped pits or recesses, which have been developed only after long consideration and experiment, and which tend to decrease the drag and/or increase the lift of each of said element surfaces.

In Fig. 1 it is observed that both the upper and lower wing surfaces 7 and 8 are provided with these recesses 9, which in general are tear drop shaped, and are of greatest depth at their respective widest diameters. It will also be noted that the shape of these recesses varies with the curvature of the surface into which they extend, and can have an aspect ratio of approximately as low as one, at such locations as the more sharply curved forward portion of a wing surface, and as when located in the surface of a body that revolves as it moves forwardly, while such ratio progresses to a ratio of approximately four or five days or even as high as eight or ten, as upon a long streamlined shape such as when positioned farther towards the rear of a wing surface, or the like.

Laterally such recesses can be spaced at approximately five to ten diameters apart, without causing added interference drag, while the depths of the said recesses at their widest diameters can be from about 10% to 25% of their diameters. To state the principle briefly, the less the diameter or the shorter the radius of curvature of a given portion of a surface, the less should be the aspect ratio of such a recess, that is, the ratio of its width to its length, while the average is probably about three. As to the size of the recesses upon craft of various dimensions, their diameter runs from about ½% to 2% of the chord of the airfoil upon which they occur, or in other words the length of the airfoil surface unit in the direction of the longitudinal axis of such recesses. Also, it will be noted from Fig. 3 that rows of these recesses 11 may be provided upon and adjacent to the forward portion of the upper surface only of the wing 2, or instead may be positioned as at 12 upon and adjacent to the forward portion of the normal under surface of said wing or upon both upper and lower surfaces. The reduction in drag and increase in lift by recessing the upper and lower surfaces, respectively, are due to localized increase in pressure and speeding the flow of fluid in the boundary layer past such surfaces.

Heretofore, the primary object of attainment has been to obtain a supreme degree of smoothness, with the least possible number and extent of protuberances present. In the constructions here advocated, smoothness is still to be desired as to each small section of the actual fluid-encountering surfaces of the flight body, but definitely shaped and arranged depressions or recesses are advocated, as a definite characteristic of the said surfaces as a whole. Thus, the drag and lift of probably any given type of airfoil, streamlined body and both aerodynamic and hydrodynamic bodies can be altered within certain limits at will.

Referring to Figs. 5 and 6, a representative portion of an airfoil surface 13 is shown as being provided with a rivet 14, the head 15 of which is seated beneath the plane of the air-contacting surface 16, and substantially at the point of greatest depth of the tear-drop shaped recess 17. Somewhat similarly, by referring to Fig. 7, the air-contacting surface 18 of a wing or other portion 19 of aircraft or the like is shown as having secured to it one end portion of a strut 20, the attached portion of which is shown as being in contact with the point of greatest depth of the tear-drop shaped recess 21, and such strut equally representing a tie, wire, or in fact any other element which may be attached to such surface. Pitting or recessing the surface of such bodies permits of a new and novel method of reducing the drag around protuberances and connections with extraneous or irregularly extending objects, such as struts, wires, stabilizers and the like where fairing is difficult or undesirable, by recessing or countersinking the surface immediately surrounding such extension or protuberance.

Of somewhat different application, the inner surface 22 of the pipe 23 in Fig. 8 is shown as being provided with spaced rows of recesses 24, which are in general shaped and arranged as hereinbefore described, so as to speed up the flow in the boundary layer of fluid and by so doing help the flow generally.

Referring to Figs. 9 and 10, there is here shown schematically the under surface of a boat or the like, which by its very nature is designed to rest upon and, therefore, be in direct intimate contact with water. It will be noted that the under portion of such boat 25 is broken up into a series of surfaces 26, which may be in stepped relation with respect to each other, while the rear portion 27 of each of said surfaces is provided with a plurality of recesses 28. In the case of a boat, which is wholly water-borne, the pits or recesses are substantially or actually circular, due to the fact that the streamlines for the water-contacting surfaces of this type of craft do not follow the same direction as the air streamlines, while in the case of water-borne craft the recessing may well cover the entire, or at least the greater portion of the wetted area. In the case of floats such as are used on hydroplanes and the like, and which are alternately in contact with both air and water, the pitting or recessing follows more generally the principles employed with aerodynamic bodies, especially as floats of this type are in motion in the gaseous medium of air to a far greater extent than they are in and upon water surfaces. In the case of hydrodynamic bodies, we make use of reduction of lift due to recessing the curved surfaces, as an advantageous factor in breaking or lessening the suction of water upon the body when traveling at high speeds, in which case reduction in lift or suction is primarily desired.

The skin of both hydro- and aero-dynamic bodies should obviously be strengthened by this method of regularly pitting or recessing, thereby making the structure more resistant to shock and stress. Such structure operates as a fluid-guiding surface to aid in controlling the direction of flow of the surrounding fluid and also aids in the stability of the body when in motion. In the case of hydro-dynamic surfaces, skins thus treated, it is found, are more buoyant when moving at high speeds and present less wetted surface upon which drag can take toll.

As for the location, size, number, depth, and such factors of these pits or recesses, it has been found that choice is largely a matter of compromise with other and usually unavoidable conditions which may be present in the use and shape of the body, as determined by commercial necessities. Generally speaking for streamlined bodies, fuselage, nacelles, floats and the like for a reduction of drag, recessing is done upon the increasing diameter from approximately 5% to 20% of the distance toward the rear, measured from the leading edge portion of the element thus recessed. From two to four rows of recesses are usually satisfactory for this purpose.

Heretofore, boundary layer control has been attempted by means of slots, ducts, flaps, vanes, air jets, suction and the like. All of these devices have attempted to direct flow over the surface by bleeding air from a pressure area and injecting it into the air stream at a point where flow separation tends to occur, or else the jet or suction is provided by a mechanical blower.

The principle employed in the present device is unique in that it controls the boundary layer through the physical condition of the surface, excepting, of course, the familiar device of mere surface smoothness. A specific example of the new principle is the utilization of shallow tear-drop shaped depressions in the surface, although the broad principle is not restricted to this particular device.

Having thus described my invention, what I claim as new and desire to protect by Letters Patent of the United States is:

1. A body, adapted for high speed flight in contact with a fluid medium, having an airfoil lifting surface provided with spaced recesses, each recess being substantially of tear drop shape from front to rear with its greatest transverse width and depth forward, and its boundary edges being in cross section faired into the surrounding airfoil surface.

2. A body, adapted for high speed flight in contact with a fluid medium, having an airfoil lifting surface provided with spaced rows of recesses, the recesses of one row following the spaces between the recesses of the next forward row, each recess being substantially of tear drop shape from front to rear with its greatest transverse width and depth forward, and its boundary edges being in cross section faired into the surrounding airfoil surface.

3. A body, adapted for high speed flight in contact with a fluid medium, having an airfoil lifting surface provided with spaced recesses, each recess being substantially of tear drop shape from front to rear with its greatest transverse width and depth forward, and its boundary edges being in cross section faired into the surrounding airfoil surface, the shape of said recesses varying in accordance with the curvature of the airfoil surface into which they extend, and their width-to-length or aspect ratio varying from approximately one in the more abruptly curved portions of such surface to approximately ten in the less abruptly curved portions.

4. A body, adapted for high speed flight in contact with a fluid medium, having an airfoil lifting surface provided with spaced recesses, each recess being substantially of tear drop shape from front to rear with its greatest transverse width and depth forward, and its boundary edges being in cross section faired into the surrounding airfoil surface, said recesses being spaced transversely between five and ten diameters apart.

5. A body, adapted for high speed flight in contact with a fluid medium, having an airfoil lifting surface provided with spaced recesses, each recess being substantially of tear drop shape from front to rear with its greatest transverse width and depth forward, and its boundary edges being in cross section faired into the surrounding airfoil surface, said recesses having diameters approximately between ½% and 2% of the chord of the airfoil, or length of body in which they are positioned.

BENJAMIN ORLOFF.